United States Patent [19]

Machida

[11] Patent Number: 5,131,514
[45] Date of Patent: Jul. 21, 1992

[54] HYDRAULIC CLUTCH CONTROL SYSTEM FOR TRANSMISSION

[75] Inventor: Shozo Machida, Ishikawa, Japan

[73] Assignee: Kabushiki Kaisha Komatsu Seisakusho, Tokyo, Japan

[21] Appl. No.: 460,058

[22] PCT Filed: May 11, 1989

[86] PCT No.: PCT/JP89/00483
§ 371 Date: Mar. 12, 1990
§ 102(e) Date: Mar. 12, 1990

[87] PCT Pub. No.: WO89/11045
PCT Pub. Date: Nov. 16, 1989

[30] Foreign Application Priority Data

May 11, 1988 [JP] Japan .................. 63-61063[U]

[51] Int. Cl.$^5$ ............................................. F16D 25/00
[52] U.S. Cl. ............................. 192/85 R; 192/85 C; 192/103 F; 137/625.69
[58] Field of Search ........... 192/85 R, 85 C, 103 F, 192/109 F; 137/625.69

[56] References Cited

U.S. PATENT DOCUMENTS

| | | | |
|---|---|---|---|
| 3,025,717 | 3/1962 | Christenson | 192/109 F X |
| 3,640,360 | 2/1972 | Dollase | 192/109 F X |
| 3,656,600 | 4/1972 | Kitano et al. | 192/109 F X |
| 3,991,865 | 11/1976 | Komatsu | 192/109 F |
| 4,029,188 | 6/1977 | Okanu | 192/109 F |
| 4,046,160 | 9/1977 | Horsch | 137/115 |
| 4,046,162 | 9/1977 | Rodeghiero | 137/489 |
| 4,751,866 | 6/1988 | Blake | 192/85 R X |

FOREIGN PATENT DOCUMENTS

| 91928 | 6/1983 | Japan | 192/85 R |
|---|---|---|---|
| 91929 | 6/1983 | Japan | 192/85 R |

Primary Examiner—Leslie A. Braun
Assistant Examiner—Andrea Pitts
Attorney, Agent, or Firm—Frost & Jacobs

[57] ABSTRACT

In order to resolve a so-called trouble "clutch dragging" caused by a poor discharge rate of pressurized oil confined within a clutch piston chamber, there is provided a hydraulic clutch control system for a transmission, which system enables the pressurized oil confined within the clutch piston chamber to flow out of the chamber in a moment upon disengagement of a clutch of the transmission. This hydraulic clutch control system is provided with: a flow-rate detecting valve (4) which communicates with the clutch piston chamber (6) through a clutch port (11) formed in one of opposite end portions of the flow-rate detecting valve (4), and communicates with both of a pressurized-oil supply pump (39) and a drain tank (56) through orifices (30) in the other of the opposite end portions of the flow-rate detecting valve (4); a pressure control valve (3) for blocking-off/establishing the communication of the pressurized oil from the flow-rate detecting valve (4) to a quick drain valve (5) through both of a pressurized-oil supply passage (29) and a pressurized-oil discharge passage (22); and the quick drain valve (5) provided with both of an inlet port (24) and a drain port (31), which ports (24) and (31) communicate with an inlet port (10) and a drain port (13) of the pressure control valve (3) respectively in one side of the quick drain valve (5) and communicate with the pressurized-oil supply pump (39) and the drain tank (56) respectively in the other side of the quick drain valve (5).

1 Claim, 3 Drawing Sheets

HYDRAULIC CLUTCH CONTROL SYSTEM FOR TRANSMISSION

FIELD OF THE INVENTION

The present invention relates to a hydraulic clutch control system for a transmission, and more particularly to the hydraulic clutch control system which enables pressurized oil confined within a clutch piston chamber to flow out of the chamber in a moment upon disengagement of a clutch of the transmission.

BACKGROUND OF THE INVENTION

Hitherto, as shown in FIG. 1, a conventional hydraulic clutch control system of this kind is constructed of a flow-rate detecting valve 104 and a pressure control valve 106. In the flow-rate detecting valve 104 of the conventional hydraulic clutch control system, as shown in FIG. 1, when the clutch piston chamber 114 of the transmission is filled with the pressurized oil, a spool valve 102 maintained in its neutral position under the influence of resilient forces exerted by springs 100, 101 is shifted leftwardly as viewed in FIG. 1 to its open position under the influence of a differential pressure of the pressurized oil acting on opposite sides of each of orifices 103 formed in the spool valve 102 whereby a large amount of the pressurized oil is allowed to flow from a pressurized-oil supply pump 113 into the clutch piston chamber 114. After completion of filling of the clutch piston chamber 114 with the pressurized oil, the spool valve 102 is shifted rightwardly as viewed in FIG. 1 to its closed position under the influence of a hydraulic force acting on the spool valve 102, which hydraulic force is produced by a difference in area of the spool valve 102 subjected to the pressurized oil. On the other hand, in the pressure control valve 106 of the conventional hydraulic clutch control system for the transmission, when a linear solenoid 105 is energized to conduct shifting operation of the transmission, the pressurized oil is supplied from the pump 113 to the flow-rate detecting valve 104 to open the valve 104. After completion of supplying of the pressurized oil to the the flow-rate detecting valve 104, a pressure of the pressurized oil filled in the clutch piston chamber 114 is gradually built-up through the pressure control valve 106.

In the conventional hydraulic clutch control system having the above construction for the transmission, when draining operation thereof is conducted, the above linear solenoid 105 is de-energized so that a spool 107 of the pressure control valve 106 shifts rightwardly as viewed in FIG. 1 under the influence of a resilient force exerted by a spring 108 to permit a drain port 109 to communicate with a oil passage 110, whereby the pressurized oil confined within the clutch piston chamber 114 flows out of the chamber to sequentially pass through a clutch port 111, orifices 103, oil chamber 112, oil passage 110 and the drain port 109, as indicated by arrows shown in FIG. 1.

Due to the above construction, the conventional hydraulic clutch control system for the transmission suffers from a so-called trouble "clutch dragging" resulted from a poor discharge rate of the pressurized oil from the clutch piston chamber 114.

SUMMARY OF THE INVENTION

In view of the above circumstances, the present invention was made. It is an object of the present invention to resolve the trouble "clutch dragging" by providing a hydraulic clutch control system for a transmission which enables the pressurized oil to flow out of the clutch piston chamber in a moment upon disengagement of the clutch.

The above object of the present invention is accomplished by providing:

A hydraulic clutch control system for a transmission, comprising a hydraulic clutch control valve constructed of: a flow-rate detecting valve provided with a spool valve which is maintained in its neutral position under the influence of resilient forces exerted by spring means upon filling of a clutch piston chamber of the transmission with pressurized oil, while provided with orifices in opposite sides of which are provided a pair of pressure chambers in which are built up pressurized-oil's pressures different from each other to shift the spool valve of the flow-rate detecting valve to an open position thereof whereby a large amount of the pressurized oil is permitted to flow into a clutch port communicating with the clutch piston chamber of the transmission, the spool valve being shifted to its closed position by a hydraulic force based on a difference in area of the spool valve subjected to the pressurized oil after completion of filling of the clutch piston chamber with the pressurized oil; and a pressure control valve which is operated by an electric signal to permit the pressurized oil to flow into the flow-rate detecting valve from a pressurized-oil supply pump to open the flow-rate detecting valve in shifting operation of the transmission, while so operated as to gradually built-up a pressure of the pressurized oil confined within the clutch piston chamber after completion of flowing of the pressurized oil into the flow-rate detecting valve, the improvement wherein:

a quick drain valve is so provided in the hydraulic clutch control valve: as to permit the spool valve of the flow-rate detecting valve to shift against the resilient forces of the spring means under the influence of a differential pressure of the pressurized oil between the pressure chambers disposed in the opposite sides of the orifices of the spool valve of the flow-rate detecting valve in pressure-modulating/supplying operation of the pressurized oil of the flow-rate detecting valve whereby communication of the pressurized oil from a clutch port of the flow-rate detecting valve to a drain port is immediately blocked-off; and as to permit the spool valve of the flow-rate detecting valve to shift under the influence of the resilient forces of the spring means upon disengagement of a clutch whereby the communication of the pressurized oil from the clutch port of the flow-rate detecting valve and the drain port is immediately established.

The primary advantage of the present invention is fast discharge of the pressurized oil confined within the clutch piston chamber from the chamber upon disengagement of the clutch, which fast discharge completely resolves the trouble "clutch dragging" inherent in the conventional hydraulic clutch control system for the transmission, the fast discharge being realized by simply combining the quick drain valve with the conventional hydraulic clutch control system constructed of the flow-rate detecting valve and the pressure control valve.

The above object, additional objects, embodiments and additional advantages of the present invention will be clarified to those skilled in the art hereinbelow with reference to the following description and accompanying drawings illustrating preferred embodiments of the present invention according to principles of the present invention.

DESCRIPTION OF THE PREFERRED EMBODIMENTS

A preferred embodiment of a hydraulic clutch control system of the present invention for the transmission will be described hereinbelow in detail with reference to FIGS. 2 and 3.

Figure 1:
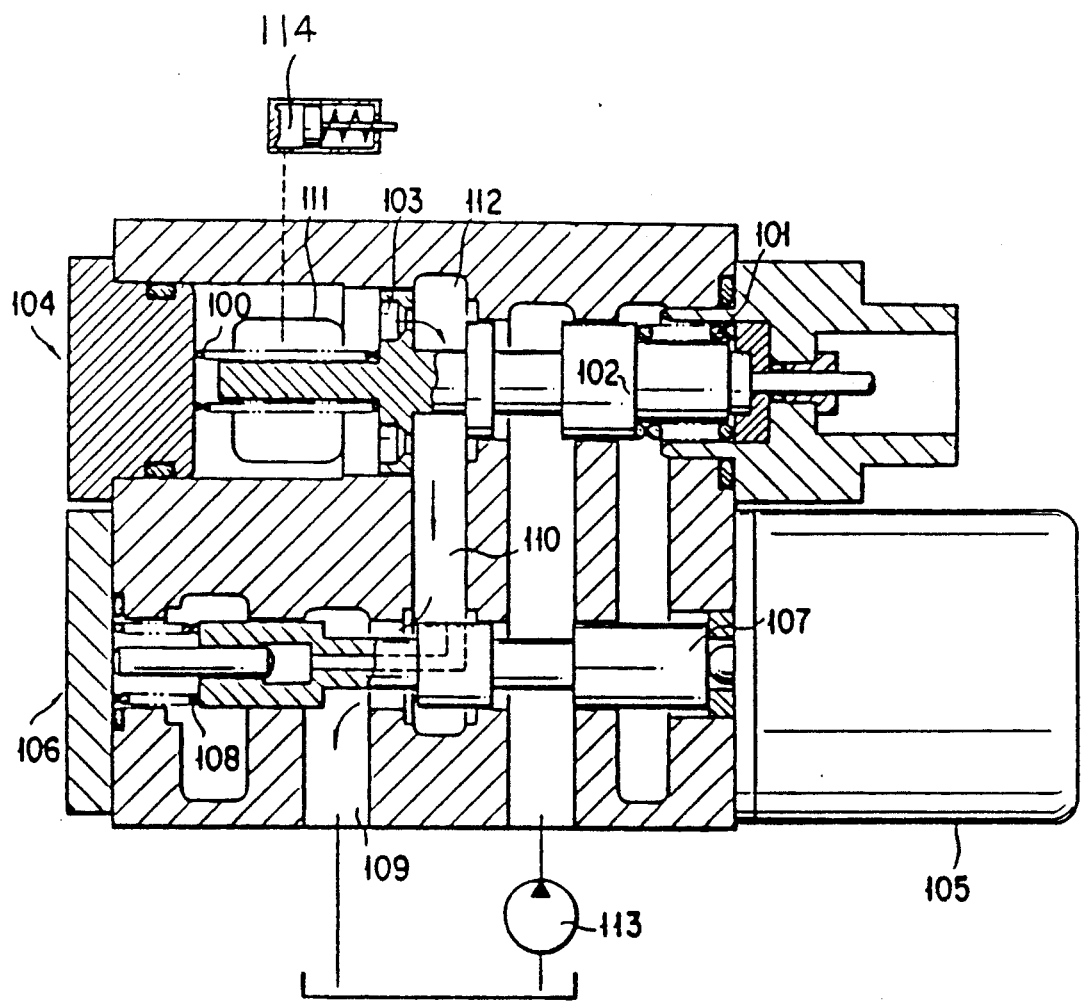
FIG. 1 is a longitudinal sectional view of the conventional hydraulic clutch control system for the transmission.
Figure 2:
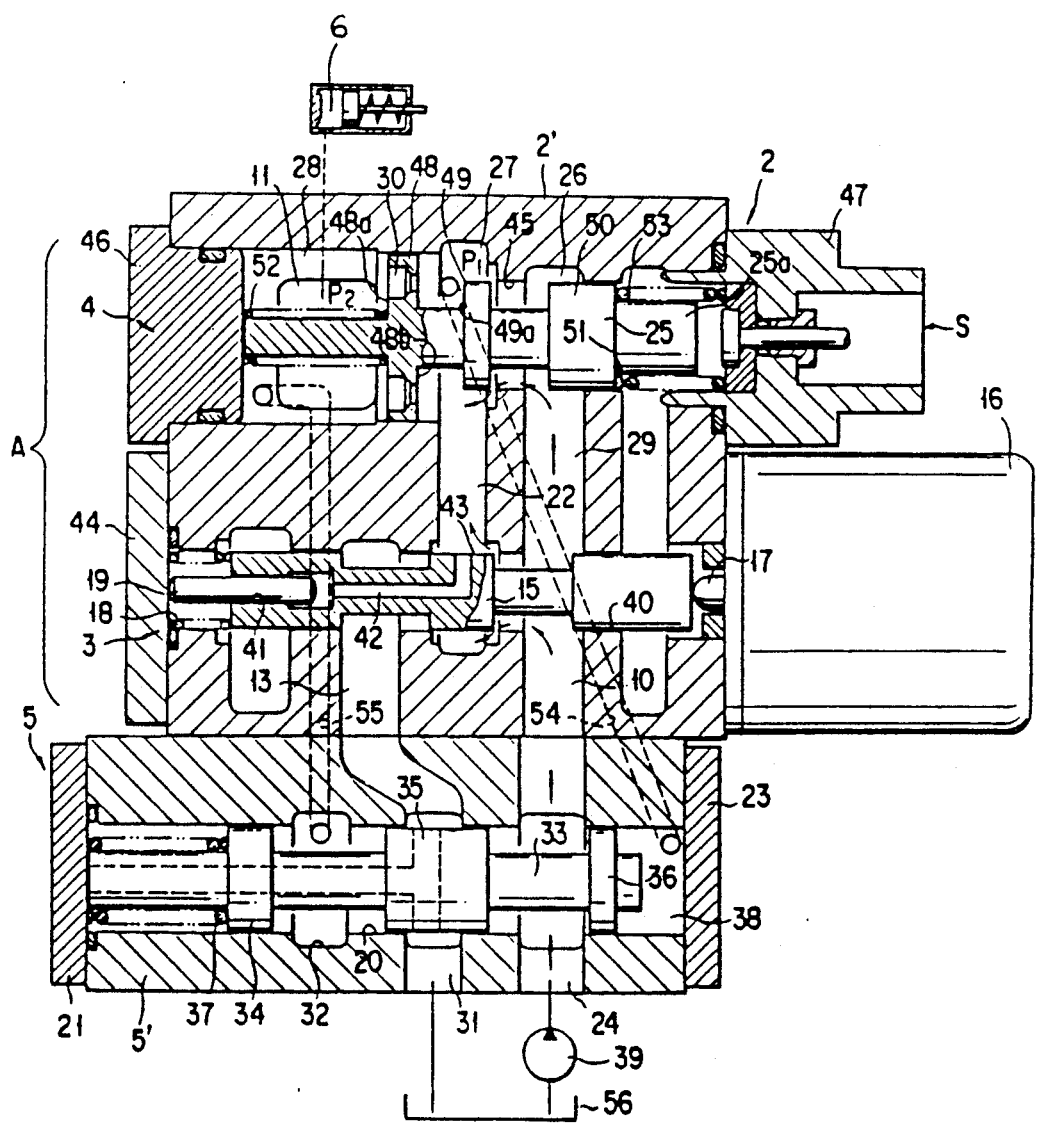
FIG. 2 is a longitudinal sectional view of an embodiment of a hydraulic clutch control system of the present invention for the transmission.

As shown in FIG. 2, the hydraulic clutch control system of the present invention for the transmission is constructed of: a hydraulic clutch control valve "A" for controlling a pressure of pressurized oil confined within a clutch piston chamber 6 of the transmission; and a quick drain valve 5. The hydraulic clutch control valve "A" is constructed of a pressure control valve 3 and a flow-rate detecting valve 4.

The hydraulic clutch control valve "A" is provided with a valve housing 2' in which are provided: an inlet port 10 for receiving the pressurized oil issued from a pressurized-oil supply pump 39; a clutch port 11 communicating with the above clutch piston chamber 6 for supplying the pressurized oil to the clutch piston chamber from the pump 39; and a drain port 13. In addition, in the valve housing 2' of the hydraulic clutch control valve "A" are further provided: the above pressure control valve 3 and the above flow-rate detecting valve 4.

The pressure control valve 3 is provided with a first spool valve bore 40 in which a first spool valve 15 is slidably mounted. In a left end surface of the first spool valve 15 is formed a cylinder portion 41. In addition, in the first spool valve 15 is further formed a pressurized-oil passage 42 communicating with the cylinder portion 41 of the first spool valve 15. This pressurized-oil passage 42 opens into a peripheral surface of a center land portion 43 of the first spool valve 15. In the cylinder portion 41 of the first spool valve 15 is inserted a load piston 19.

A linear solenoid 16 is fixedly mounted on a right side of a lower portion of the valve housing 2' of the hydraulic clutch control valve "A". On the other hand, a left end of the first spool valve bore 40 is closed with a closure element 44. A first spring 18 is interposed between the closure element 44 and a left end surface of the first spool valve 15 to urge the spool valve 15 rightwardly as viewed in FIG. 2 whereby a right end surface of the first spool valve 15 abuts on a plunger 17 of the linear solenoid 16.

The flow-rate detecting valve 4 is provided with a second spool valve bore 45 formed in an upper portion of the valve housing 2' of the flow-rate detecting valve 4. In the second spool valve bore 45 of the flow-rate detecting valve 4 is slidably mounted a second spool valve 25. In addition, the second spool valve bore 45 communicates with the first spool valve bore 40 through the pressurized-oil passages 22, 29. On the other hand, the clutch port 11 of the valve housing 2' of the hydraulic clutch control valve "A" communicates with the clutch piston chamber 6 of the transmission through the second spool valve bore 45.

A left end side of the second spool valve bore 45 as viewed in FIG. 2 is closed with a right end cover 46. On the other hand, a left end cover 47 is provided in a right end side of the second spool valve bore 45.

The second spool valve 25 is provided with a first 48, second 49 and a third 50 land, while further provided with a spring bearing 51 in a right-end portion 25a thereof. A second spring 52 is interposed between the left end cover 46 and a left end surface of the first land portion 48 of the second spool valve 25. In addition, a third spring 53 is interposed between the spring bearing 51 and the right end cover 47 of the flow-rate detecting valve 4 in which are formed: a third pressure chamber 28 between the left end cover 46 and the first land portion 48; a second pressure chamber 27 between the first land portion 49 and the second land portion 50; and a first pressure chamber 26 between the second land portion 49 and the third land portion 50, respectively. In the first land portion 48 of the second spool valve 25 are formed a plurality of orifices 30 through which the second pressure chamber 27 communicates with the third pressure chamber 28. Now, in the second spool valve 25 of the flow-rate detecting valve 4 are defined: a pressure area of the left end surface 48a of the first land portion 48 as $A_3$; that of the right end surface 48b of the first land portion 48 as $A_1$; and that of the left end surface 49a of the second land portion 49 as $A_2$, and the relationship between these areas $A_1$, $A_2$ and $A_3$ is expressed by:

$$A_3 > A_1 > A_2$$

A switch S for detecting completion of supplying of the pressurized oil is mounted in the cover 47.

The quick drain valve 5 is provided with a valve housing 5' in which is formed a third spool valve bore 20 opposite ends of which are closed with covers 21, 23. In addition, in the valve housing 5' of the quick drain valve 5 are formed: an inlet port 24 communicating with a pressurized-oil pump 39; a drain port 31 communicating with a tank 56; and a pressure port 32.

In the third spool valve bore 20 is slidably mounted a third spool valve 33 provided with three land portions 34, 35, 36. A fourth spring 37 is interposed between the land portion 34 of the third spool valve 33 and the cover 21. On the other hand, a pressure chamber 38 is formed between the land portion 36 of the third spool valve 33 and the cover 23.

The pressure chamber 38 of the quick drain valve 5 communicates with the second pressure chamber 27 of the flow-rate detecting valve 4 through a first communication passage 54. On the other hand, the inlet port 24 of the quick drain valve 5 communicates with the inlet port 10 of the pressure control valve 3. The drain port 31 of the quick drain valve 5 communicates with the drain port 13 of the pressure control valve 3. The pressure port 32 of the quick drain valve 5 communicates with the third pressure chamber 28 of the flow-rate detecting valve 4 through a second communication passage 55.

Now, operation of the hydraulic clutch control system of the present invention for the transmission will be described.

Figure 3:
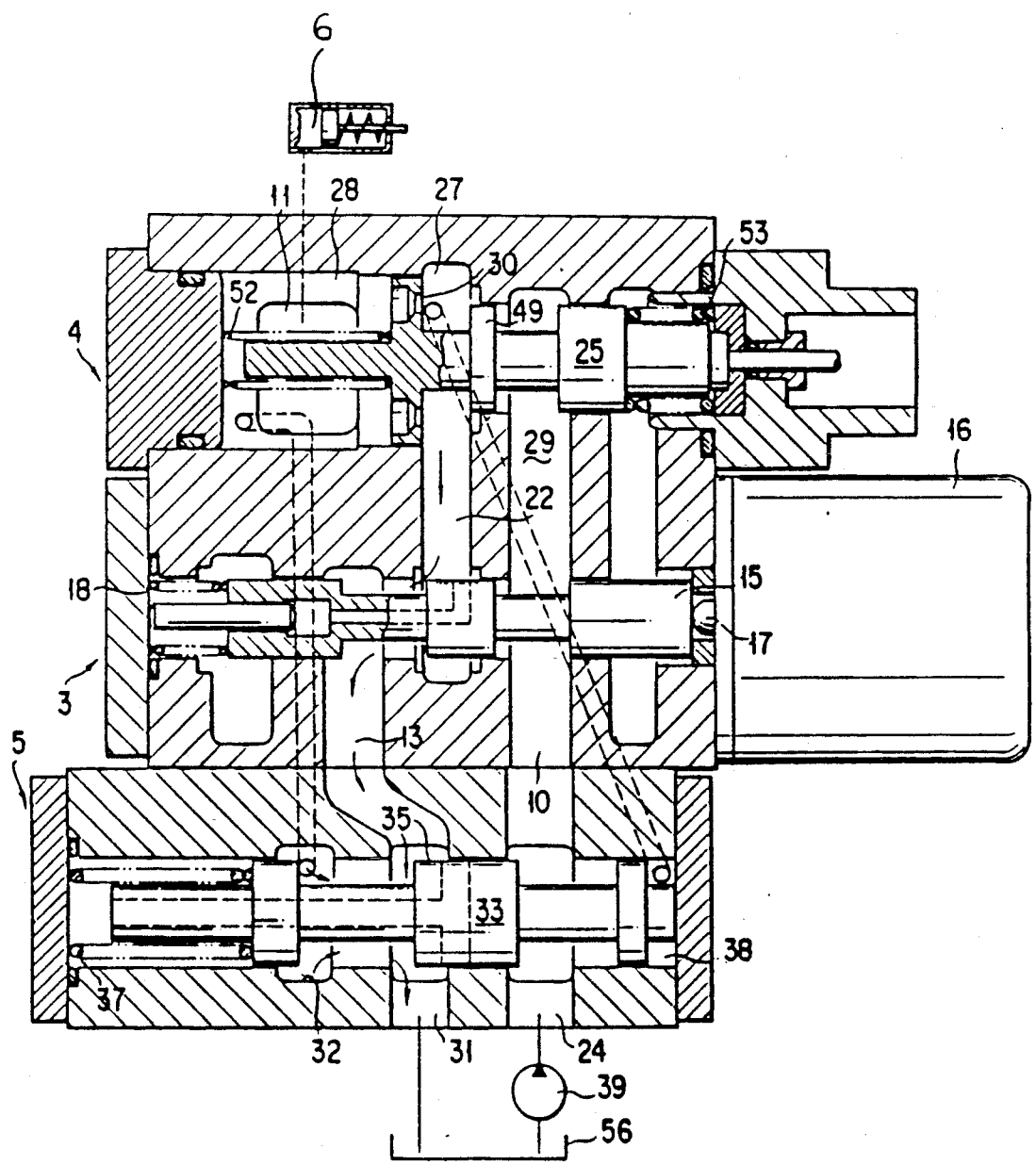
FIG. 3 is a longitudinal sectional view of the embodiment of the present invention shown in FIG. 2, illustrating the operation of the hydraulic clutch control system of the present invention upon disengagement of the clutch of the transmission.

When no pressure of the pressurized oil is developed in the second 27 and the third 28 chamber, as shown in FIG. 3, the second spool valve 25 is maintained in its neutral position under the influence of resilient forces exerted by the second 52 and the third 53 spring, so that the pressurized oil having entered the pressurized-oil passage 29 through the inlet ports 24, 10 remains therein because the second spool valve 25 is still closed.

Under such circumstances, when the linear solenoid 16 is energized, the first spool valve 15 of the pressure control valve 3 is urged leftwardly as viewed in FIG. 3 by the plunger 17 of the linear solenoid 16 to permit the pressurized oil remaining in the pressurized-oil passage 29 to flow into the second pressure chamber 27 through the pressurized-oil passage 22. Then, the thus flowing pressurized oil flows into the third pressure chamber 28 through the orifices 30 to reach the clutch port 11 of the flow-rate detecting valve 4, through which clutch port 11 the pressurized oil flows into the clutch piston chamber 6 of the transmission. At this time, a differential pressure of the pressurized oil is developed between the third pressure chamber 28 and the second pressure chamber 27.

If a pressure of the pressurized oil confined within the second pressure chamber 27 is defined as $P_1$, and that of the pressurized oil confined within the third pressure chamber 28 is defined as $P_2$, the relationship between the pressures $P_1$ and $P_2$ is expressed by:

$$P_1 > P_2.$$

Since the pressure $P_2$ is substantially zero, the following equations are obtained:

$$(A_1 - A_2)P_1 > A_3P_2 \quad (1)$$

$$(A_1 - A_2)P_1 > O \quad (1')$$

As a result, a force based on the above equation (1') shifts the second spool valve 25 leftwardly as viewed in FIG. 3 against the resilient force exerted by the second spring 52. Consequently, the second spool valve 25 is opened at its land portion 49 to permit the pressurized oil having entered the pressurized-oil passage 29 from the pump 39 to flow into the second pressure chamber 27. Then, the pressurized oil passing through the pressurized-oil passage 29 continuously flows into the clutch piston chamber 6 through the orifices 30, third pressure chamber 28 and the clutch port 11 until the clutch piston chamber 6 is filled with the pressurized oil.

At this time, since the pressurized oil is supplied from the second pressure chamber 27 of the flow-rate detecting valve 4 to the pressure chamber 38 of the quick drain valve 5, the third spool valve 33 of the quick drain valve 5 is shifted leftwardly as viewed in FIG. 3 against the fourth spring 37 so that communication of the pressurized oil from the pressure port 32 of the quick drain valve 5 to the drain port 31 of the quick drain valve 5 is blocked-off by the land portion 35 of the quick drain valve 5.

After completion of filling of the clutch piston chamber 6 with the pressurized oil, the pressurized oil supplied from the pump 39 enters the clutch piston chamber 6 through the orifices 30 so that the pressure $P_1$ is equal to the pressure $P_2$, namely $$P_1 = P_2$$

If a spring constant of the third spring 53 is defined as $K_1$; that of the second spring 52 is defined as $K_2$; and a stroke of the second spool valve 25 is defined as X, the following equation (2) is obtained:

$$K_2X + A_3P_2 + A_2P_1 = A_1P_1 + K_1X \quad (2)$$

Consequently, the following equation (2') is obtained:

$$A_3P_2 + (A_2 - A_1)P_1 = (K_1 - K_2)X \quad (2')$$

Since $P_1 = P_2$, the above equation (2') is simplified as follows:

$$(A_3 + A_2 - A_1)P_2 = (K_1 - K_2)X \quad (3)$$

In the above equation (3), if the spring constants $K_1$, $K_2$ satisfy the relationship: $K_1 > K_2$, the following equation (4) is derived from the equation (3):

$$P_2 = (K_1 - K_2)X/(A_3 + A_2 - A_1) \quad (4)$$

Consequently, when the spring constants $K_1$, $K_2$ and the stroke X are suitably determined and the pressure $P_2$ satisfies the above equation (4), the second spool valve 25 is shifted rightwardly as viewed in FIG. 3 by a hydraulic force acting on the second spool valve 25, the hydraulic force being based on a difference in area of the second spool valve 25 subjected to the pressurized oil.

In drain operation of the hydraulic clutch control system of the present invention for the transmission, when the linear solenoid 16 is de-energized, the first spool valve 15 of the pressure control valve is shifted rightwardly as viewed in FIG. 3 by the first spring 18 to permit the drain port 13 to communicate with the pressurized-oil passage 22, so that a pressure of the pressurized oil confined within the second pressure chamber 27 drops, and then a pressure of chamber 38 communicating with the second pressure chamber 27 also drops.

Consequently, in the quick drain valve 5, the third spool valve 33 is shifted rightwardly as viewed in FIG. 3 by the fourth spring 37 to permit the pressure port 32 to communicate with the drain port 31.

As a result, the pressurized oil confined within the clutch piston chamber 6 flows out of the chamber to sequentially pass through the clutch port 11, orifices 30, second pressure chamber 27, pressurized-oil passage 22, and the drain ports 13, 31. At the same time, the pressurized oil additionally flows out of the clutch piston chamber 6 to pass through the clutch port 11, pressure port 32 and the drain port 31 to enable the pressurized oil confined within the clutch piston chamber 6 to flow out of the same in a moment upon disengagment of the clutch.

What is claimed is:

1. A hydraulic clutch control system for a transmission, said hydraulic clutch control system including a flow-rate detecting valve and a pressure control valve, said flow-rate detecting valve including
   (i) a spool valve including a land portion, said land portion including first and second end surfaces;
   (ii) spring means for resiliently urging said spool valve toward a neutral position, said spring means being operable to maintain said spool valve at said neutral position during the filling of a clutch piston chamber of said transmission with pressurized-oil;

(iii) a first pressure chamber formed adjacent said first end surface:

(iv) a second pressure chamber formed adjacent said second end surface, said second pressure chamber being in fluid communication with said clutch piston chamber through a clutch port; and (v) at least one orifice formed through said land portion through which said first pressure chamber communicates with said second pressure chamber whereby said spool valve assumes an open position in response to a difference in pressure between said first and second pressure chambers at which position a large amount of pressurized-oil is permitted to flow into said clutch piston chamber, and whereby said spool valve assumes a closed position in response to a cessation of the flow of pressurized-oil into said clutch piston chamber, said pressure control valve being operable to permit pressurized oil to flow into said flow-rate detecting valve from a pressurized-oil supply pump so as to open said flow-rate detecting valve in shifting operation of said transmission, the improvement wherein said hydraulic clutch control valve includes a quick drain valve, said quick drain valve comprising:

(a) a valve housing having an inlet port and a drain port, said inlet port being in fluid communication with said pressurized-oil supply pump and with an inlet port of said flow-rate detecting valve, said drain port being in fluid communication with a tank and with said drain port of said pressure control valve;

(b) a spool valve bore formed in said housing so as to cross each of said inlet port and said drain port, said spool valve bore including first and second closed end portions;

(c) a spool valve slidably mounted in said spool valve bore, said spool valve including first, second and third land portions axially spaced apart from each other;

(d) spring means interposed between said first closed end portion and said first land portion for urging said spool valve toward said second closed end portion;

(e) a pressure port formed in said valve housing in an area between said first and second land portions;

(f) a pressure chamber formed in said valve housing in a space between said second closed end portion and said third land portion;

(g) a first communication passage through which said pressure chamber of said quick drain valve communicates with said first pressure chamber of said flow-rate detecting valve; and (h) a second communication passage through which said pressure port of said quick drain valve communicates with said second pressure chamber of said flow-rate detecting valve.

* * * * *